(12) United States Patent
Feil et al.

(10) Patent No.: US 10,725,140 B2
(45) Date of Patent: Jul. 28, 2020

(54) OPERATING OF A TRANSMISSION DEVICE OF A LIGHTING DEVICE COMPRISING AN ILLUMINATION DEVICE

(71) Applicant: OSRAM GmbH, München (DE)

(72) Inventors: Henry Feil, Unterhaching (DE); Karl-Heinz Oberkoxholt, München (DE); Christoph Peitz, Lippstadt (DE); Michel Stutz, München (DE); Andrej Wallwitz, München (DE)

(73) Assignee: Osram GmbH, Munich (DE)

( * ) Notice: Subject to any disclaimer, the term of this patent is extended or adjusted under 35 U.S.C. 154(b) by 306 days.

(21) Appl. No.: 15/836,608

(22) Filed: Dec. 8, 2017

(65) Prior Publication Data
US 2018/0180701 A1 Jun. 28, 2018

(30) Foreign Application Priority Data
Dec. 23, 2016 (DE) .......................... 10 2016 125 636

(51) Int. Cl.
*G01S 1/68* (2006.01)
*H05B 47/19* (2020.01)
*F21V 23/00* (2015.01)

(52) U.S. Cl.
CPC ............... *G01S 1/68* (2013.01); *F21V 23/00* (2013.01); *H05B 47/19* (2020.01)

(58) Field of Classification Search
CPC ..... G01S 1/68; G01S 1/02; G01S 1/24; G01S 1/245; G01S 1/042; F21V 23/00; H05B 37/0272
USPC ........................................................ 342/385
See application file for complete search history.

(56) References Cited

U.S. PATENT DOCUMENTS

| 9,367,632 B2 | 6/2016 | Revels | |
|---|---|---|---|
| 2008/0207125 A1 | 8/2008 | Wei et al. | |
| 2014/0154987 A1* | 6/2014 | Lee | H04W 4/80 455/41.2 |
| 2014/0372072 A1* | 12/2014 | Guo | H04B 10/116 702/150 |
| 2015/0359068 A1* | 12/2015 | Baek | H05B 37/029 315/151 |
| 2016/0105788 A1 | 4/2016 | Helms et al. | |
| 2016/0286631 A1* | 9/2016 | Wan | H04W 4/70 |

(Continued)

FOREIGN PATENT DOCUMENTS

| DE | 603 04 856 T2 | 11/2006 |
|---|---|---|
| WO | 2016/060696 A1 | 4/2016 |
| WO | 2016/073215 A1 | 5/2016 |

OTHER PUBLICATIONS

EPO; App. No. 17195947.1; European Search Report dated May 15, 2018 (pp. 1-8).

*Primary Examiner* — Harry K Liu
(74) *Attorney, Agent, or Firm* — Viering, Jentschura & Partner MBB

(57) ABSTRACT

The invention relates to a method for operating a transmission device of a lighting device comprising an illumination device, wherein the transmission device is arranged in or immediately on the illumination device and wirelessly emits a radio signal with identification signals that are specific to the transmission device, wherein the radio signal is emitted according to exactly one predetermined radio standard, wherein the radio signal contains the specific identification data at least in two data formats that are different from each other.

16 Claims, 4 Drawing Sheets

(56) References Cited

U.S. PATENT DOCUMENTS

2016/0309288 A1  10/2016  Helms et al.
2017/0079121 A1* 3/2017  Jayawardena ..... H05B 37/0272
2017/0142813 A1* 5/2017  Sahni ................ A01G 22/00

* cited by examiner

OPERATING OF A TRANSMISSION DEVICE OF A LIGHTING DEVICE COMPRISING AN ILLUMINATION DEVICE

CROSS-REFERENCE TO RELATED APPLICATION

This application claims the benefit of German Patent Application Number DE 10 2016 125 636.6 filed Dec. 23, 2016, which is incorporated by reference in its entirety herein.

TECHNICAL FIELD

The invention relates to a method for operating a transmission device of a lighting device comprising an illumination device, wherein the transmission device is arranged in or immediately on the illumination device and wirelessly emits a radio signal with identification data that are specific to the transmission device. The invention further relates to a lighting device with a transmission device and an illumination device, wherein the transmission device is arranged in or immediately on the illumination device and is configured to emit a radio signal with identification data that are specific to the transmission device.

BACKGROUND

Lighting systems, lighting devices, as well as illumination devices and transmission devices of a generic kind are basically comprehensively known in the prior art so that a separate document for proof is not required. By means of lighting systems spaces, for instance outside or also inside buildings, are lit in a predeterminable way in order to allow for or support an intended use. For the lighting systems more and more frequently lighting devices are employed, which besides an illuminating device that emits light in a predeterminable way, also comprise a transmission device, which is at least configured to wirelessly emit specific identification data, for instance in the way of radio broadcasting. Preferably this transmission device is configured to emit the radio signal in the manner of near field radio communication. Such a transmission device is also referred to as a "beacon" in the prior art.

So-called beacons can be combined with illumination devices in order to provide lamp-specific or also other information by means of their radio signal. The beacon technology is based on a transmitter system or on a transmitter-receiver system. A beacon (in German also referred to as Leuchtfeuer, Bake, Peilsender or the like) is a small, mostly battery-operated sender, which emits a radio signal, preferably at definable time intervals, for instance based on a Bluetooth low energy standard (BLE). The radio signal of a beacon is characterized by the identification data, which for instance comprise a unique identification number, for instance referred to in English as a universally unique identifier (UUID). Beacons can be used for assigning an, in particular digital, identification to objects and/or places. Objects on which a beacon is mounted, as well as places at which a beacon is installed, for instance on a wall or a ceiling, in this way can be identified by communication terminals, for instance smart phones, laptops and/or the like, in the signal field of the beacon.

With the aid of a beacon thereby for instance a place can be identified or a localization be performed. By way of arranging one or several beacons within a predetermined area, for instance a building area or the like, a kind of radio-based grid can be provided, which allows for a communication terminal present in this area by means of its radio interface, in particular BLE interface, as well as corresponding evaluation options, to determine a position of its own. The individual identification data of the installed beacons in this connection provide a place with an identification, on the basis of which the communication end device, at least approximately can determine the position. In principle in any case a transmission range of a respective beacon can be determined. By suitable evaluation, for instance using predetermined algorithms or the like, the precision of the determined position, for instance whilst evaluating a signal strength and/or the like, can be improved. Preferably, the communication terminal can access data of a data storage for this purpose, for instance via a communication network such as the internet, a mobile radio network and/or the like. The data storage for instance can be a cloud server or the like. Here for instance the identification data and associated position data can be recorded in a map.

If the communication terminal comes within reach of the transmission device or the beacon, it can determine its own position on the basis of the determined identification data thus for instance via a server request. Whilst using further radio signals of further transmission devices or beacons by means of localization algorithms the precision can be improved, in particular from a receiving field strength of the respective radio signal of the transmission device or of the beacon a distance from the respective transmission device or the respective beacon can be determined.

In principle in the lighting technology in the case of lighting systems of a generic kind or their lighting devices transmission devices or beacons can be installed. In this connection in particular the advantage is used that a light installation provides a permanent access to energy in order to supply electrical energy to the transmission device or the beacon. This leads to an advantage, namely that the transmission device or the beacon requires no energy supply of its own in the form of a battery and thus corresponding maintenance expense can be saved. Moreover, this embodiment allows for also selecting settings of the transmission device or the beacon, which involve a high energy consumption, without this having to have an effect on an operating life of the beacon. Moreover, installation processes of such transmission devices or beacons and the light technology can be standardized. A further advantage is a defined locking position of the transmission device or the beacon, which is preferably selected such that the transmission device or the beacon are protected against manipulation. Thereby, a place thus can be assigned a reliably safe identification.

An overview about use potentials of the integration of a transmission device or a beacon into a lighting device is rendered from the following, non-exhaustive list.

The energy supply of the light installation can be used instead of an energy supply by a battery in order to reduce for instance the life cycle costs of the transmission device or the beacon.

The electrical energy supply of the lighting system or the lighting device can be used in order to adjust transmission parameters of the signal of the transmission device or of the beacon to a service and not to an available remaining energy amount or to parameters of the battery. For instance frequent transmission cycles generate a high precision of the respective service, however, this can also lead to a raised energy consumption.

The exchange of the battery of conventional transmission devices or beacons involves risks, for instance with regard to handling errors.

An unavailability of services can be avoided by an uninterrupted energy supply of the transmission device or of the beacon.

An installation place below a ceiling can be advantageous for a signal propagation of the signal of the transmission device or the beacon.

An installation place below the ceiling can render the overall system more robust against interferences or shadings through other objects at floor level in contrast to an installation of the transmission device or of the beacon itself at floor level.

The transmission device or the beacon can be protected against manipulations or unauthorized access— whether inadvertently or intentionally.

The lighting system as well as services, such as for instance localization services or the like, can be offered as overall system "from a single source".

Moreover, the possibility of using a safe communication network of the lighting system exists for instance in order to configure the transmission devices or the beacon or to interlink the transmission devices or the beacons with each other.

A standardization of installation processes of transmission devices or beacons and the lighting system can be facilitated.

Further, there exists the possibility of coupling to further system elements of a peripheral building infrastructure via the communication network of the lighting system, for instance with elements of the safety technology and/or the like.

An optically appealing lighting system can be provided since the transmission device or the beacon can be arranged invisibly in the respective lighting device or in the lighting system.

A beacon can be integrated as a transmission device within a lighting device of a lighting system. The lighting system can comprise a multitude of lighting devices. The lighting device besides the beacon comprises the illumination device, which by means of one or several illumination means provides the desired lighting function. The beacon and the illumination device are in communication with each other. The beacon is preferably arranged to be integrated within the lighting device, in particular within a common housing. This means that there is no need to provide a separate housing for the beacon. Thereby the beacon can be simultaneously arranged to be protected so that the intended function can be provided with high reliability. Further lighting devices of the lighting system can be designed to be preferably identical to the lighting device. Moreover, of course, also in particular with regard to their illumination devices different lighting devices can be provided. In this connection the transmission devices or beacons, however, can be of equal design.

The beacon is designed to wirelessly emit a radio signal with the identification data that are specific to the beacon. Preferably the emission is effected by radio whilst using a BLE standard. The beacon further comprises preferably a control unit, which comprises a computing unit as well as a storage unit. In the storage unit an executable computer program, which is provided for the computing unit, so that by means of the computing unit a predetermined control function can be realized.

The beacon can further be in communication with further beacons. The communication link can equally be configured as a wireless communication link according to the BLE standard. Equally as well, though, a wired communication link can be envisaged. The communication link between the beacon and the further beacons is preferably bidirectional in order to be able to exchange signals, in particular data.

Moreover, the beacon can be connected to a data infrastructure device via a further communication link. The data infrastructure device can serve for controlling the lighting system, here in particular the lighting devices of the lighting system. The infrastructure device can for instance comprise the internet or a central service provision server. The data infrastructure device can further serve for controlling and/or transmitting data. The local beacon of the lighting device can be configured as mere transmission device for emitting radio signals of the kind of a radio broadcasting operation or also as combined transmitter-receiver device, which besides the emitting of radio signals of the kind of a radio broadcasting operation also facilitates a receiving of radio signals or even a bidirectional communication with a communication terminal.

The radio signal of the beacon can be received by means of communication terminals, such as for instance a smart phone, a laptop and/or the like.

According to an example of use users or devices may possibly be faced with the challenge of having to orientate themselves, to navigate within an area, or wishing to find or use other local digital services, such as for instance apps, app functions, Google maps, Lightify, a light control and/or the like. The lighting system with integrated beacons within a predetermined area can become a localization or orientation system for these use potentials. With a thus realizable self-localization of the communication terminal now services can be provided, for instance a navigation, a provision of site-specific information, services and/or the like.

One aspect of the beacon technology is the possibility of configuring typical parameters, such as for instance a signal strength, a transmission interval and/or the like of the beacon. With different configurations various application scenarios can be individually supported. If for instance a high service quality with regard to a precise localization in short intervals is desired, for instance in an indoor navigation, for instance very short sending intervals may need to be configured.

In particular in the case of digitally controlled lighting systems, for instance using Digital Addressable Lighting Interfaces (DALI), it should be possible to unambiguously identify which illumination means or which illumination device is arranged at which place in order to facilitate by means of digital light control an exact control of the illumination devices or their illumination means in a certain area. The lighting devices or the illumination devices, respectively, require for this purpose a clear address, which reflects their position within a predetermined area. The person skilled in the art refers to such assignment of lighting devices or illumination devices, respectively, to corresponding positions or addresses, respectively, also as "commissioning". In this connection preferably several pieces of information should be combined, namely an unambiguous identification information of a respective lighting device or illumination device, preferably of the kind of unambiguous specific identification data, an installation site of the respective lighting device or illumination device within a predetermined area, i.e., a physical address of the lighting device or the illumination device, as well as an identification of the lighting device or the illumination device, i.e. for instance their digital address.

The digital address of a lighting device or illumination device can for instance be transmitted via a powerline communication or a similar power-based communication solution via the energy propagation to a control or data processing unit. The illumination device or a ballast of the illumination device can thus register with the digital address with the control unit. Thus, however, the information at which physical place within the predetermined area the illumination device is actually arranged is not yet available. This information, however, is required if only a defined area, for instance only a conference room or part thereof or the like, is to be lit.

Presently lighting systems or illumination means and at the same time their sites as a rule cannot be easily electronically identified. Typically, it can only be recognized via a sticker or an embossment, for instance on a housing of the lighting device or the illumination device, what kind of lighting device or illumination device or of the illumination means it is. Another elaborate possibility consists in having every digitally registered illumination device blink individually as part of the illumination system and manually mark a position information within a layout.

In order to connect illumination devices and/or illumination means as part of the illumination system efficiently with a light management system (LMS), it would be advantageous to have at one's disposal one or several electronical or digital identification numbers for identification of the overall system or of individual components of the overall system.

A specific problem further consists in the fact that as a rule in an installation plan positions of the illumination devices or illumination means for a lighting area or a service area are fixed. This provides a person in charge of installation with a guideline as to which of the delivered or commissioned lighting devices or illumination devices, for instance with regard to a lamp type or the like, is to be arranged in which position of the area, for instance the building, according to the installation plan.

Site-specific services or services, such as for instance navigation of a user or the like, by means of a beacon should be permanently and without restriction available to the user within a predetermined area. This requires besides an uninterrupted electrical energy supply also a regular maintenance or possibly also updating of computing programs such as for instance the firmware or the like.

Services using a beacon, such as for instance a navigation by means of a communication end device, should be available to the users preferably permanently and if possible without restriction. This requires amongst other things an uninterrupted energy supply for the beacons. Nevertheless, it turned out to be an obstacle that communication terminals as a rule are configured for a predetermined, in particular proprietary, communication protocol. The communication protocols, which meanwhile are in use, as a rule are based on the BLE standard as radio standard. Depending on the respective communication terminal specific communication protocol the communication terminals in some cases respond quite differently. A beacon protocol established in this connection is for example the "iBeacon" Protocol® of the company Apple Inc. Communication terminals based on the operating system iOS® of the company Apple Inc. can for instance receive and process a radio signal according to the iBeacon Protocol®. Moreover, further such beacon protocols are known, such as for instance "Eddiestone"® of the company Google or the beacon protocol "AltBeacon", which is an open source protocol. In order to allow for an as broad as possible application of the beacon technology, it may thus be necessary to employ several beacon protocols in parallel. This raises the problem for the manufacture of beacons, in particular with regard to their energy supply as well as the possibly reliable provision of a corresponding service and the like. Of course, there is the possibility of providing for each beacon protocol an adjusted beacon of its own. This, however, turns out to be expensive, in particular with regard to the energy supply and/or constructive aspects concerning the spatial arrangement of the beacon. Moreover, the number of the specific identification data would be correspondingly increased.

If for instance a manager of a supermarket would like to make sure that the offered services, such as for instance a navigation of a customer through the supermarket or the like, are available without restriction to any customer with any communication terminal, according to the possible manufacturer-specific or operating system specific communication terminal adjusted beacons would need to be installed. However, this leads to the requirement that for instance in the case of two beacon protocols at least double the number of beacons need to be installed. This leads to high investment costs, high life cycle costs due to a corresponding battery change, a high installation expense as well as a high installation expense for fixing a corresponding beacon protocol and the like. Moreover, also problems with the signal processing through the communication terminals can be caused if the various beacons for instance are not orchestrated with regard to a transmission time and a radio signal strength or the like.

It is therefore the task of the invention to improve a functionality of the transmission device of the lighting device.

SUMMARY

As a solution in accordance with the invention, a method as well as a lighting device according to the independent claims is suggested.

Further advantageous embodiments derive on the basis of features of the dependent claims.

With regard to a method of the generic kind it is suggested in particular that the radio signal is emitted according to exactly one predetermined radio standard, wherein the radio signal contains at least the specific identification data at least in two data formats that are different from each other.

With regard to a lighting device of the generic kind it is in particular suggested that the transmission device is further configured to emit the radio signal according to exactly one predetermined radio standard, wherein the radio signal contains the specific identification data at least in two data formats that are different from each other.

The invention is based on the insight that merely by designing the radio signal, preferably within the predetermined scope of the corresponding radio standard, various beacon protocols can be realized so that preferably merely exactly one single predetermined radio standard needs to be employed. In this connection it is possible to design the radio signal in at least two data formats that are different from each other in such a way that it is recognized by the corresponding communication terminal, which uses the corresponding data format, as radio signal of a beacon suitable for the communication terminal. Thereby for the application of the beacon technology for communication terminals, which are based on different data formats, no separate beacons or transmission devices need to be provided anymore.

It turns out to be particularly advantageous if this transmission device or the beacon merely requires a single radio unit in order to emit the radio signal with the different data formats. However, besides it may also be envisaged that two or several radio units are provided, which are assigned to respective data formats. The radio units can be in communication with each other so that the emitting of the radio signal are suitably synchronized by the radio units. For this purpose it may also be envisaged that the transmission unit comprises a control unit to which the radio units are connected and which controls the radio units accordingly. For instance it may be envisaged that the control unit provides the specific identification data for the radio units, and the radio units then format and correspondingly synchronize the radio signal. It may also be envisaged that, if merely a single radio unit is envisaged for emitting the radio signal, the control unit formats the specific identification data in the at least two data formats that are different from each other and transmits a corresponding control signal to the radio unit, which then emits the radio signal.

The transmission device or the beacon moreover may also comprise a receiver unit, which allows, preferably by radio, in particular near field radio communication, for receiving a communication signal, for instance from a communication terminal, which is situated within communication range of the beacon, whereby then a transmitter-receiver device is formed. Thereby it is possible to additionally provide functionality, for instance by evaluating the communication signal on the side of the beacon and on the basis of the data gained thereby in addition to the radio signal further data can be emitted, for instance with regard to a function of the lighting device, used illumination means of the illumination device of the lighting device, available data formats and/or the like. Near field radio communication in the present case means in particular that by means of a radio connection a communication range of several meters, for instance in a range of about 1 m to about 25 m, preferably in a range of about 1 m to about 10 m, in particular preferably within a range of about 2 m to about 5 m, can be achieved.

In this connection the invention due to the arrangement of the transmission device or the beacon allows for using an existing energy and/or communication interface of a light installation or the lighting device or of an illumination means of the lighting device for the energy supply of one or several of the transmission devices or beacons, wherein this may comprise on the secondary side and/or on the primary side also for instance communication interfaces of an electronical ballast (ECG) of the illumination device as well as of the communication and/or energy and communication interfaces.

One option, in which a separate energy converter can be saved for the transmission device or the beacon, is further an electrical terminal of the transmission device or the beacon in parallel to an illumination means, in particular to a light-emitting diode unit or a group of light-emitting diodes or possibly a light-emitting diode carrier module and/or the like.

The invention suggests to emit two or several radio signals for instance several beacon signals of the same protocol with different content or different beacon protocols in parallel based on a single radio standard such as the Bluetooth low energy standard, a WLAN standard, or the like, with the aid of one or several transmission devices or beacons, wherein the transmission device or the beacon can be supplied with electrical energy preferably via the illumination device of the lighting device.

It may be envisaged that parameters of the radio signal can be adjusted as required for instance to be better adapted to the respective data format. A parameter of the radio signal for instance can be a carrier frequency, a transmission power, a phasing, a bandwidth of the radio signal, a signal type, an information type, and/or the like. By means of the transmission device it should be possible to offer preferably several services, preferably in parallel. For instance for a service A a high position precision should be required so that the corresponding radio signal is emitted with the corresponding data format with a low transmission performance but a high local resolution. In a service B, however, for instance an as great as possible range could be desired instead. Accordingly, in an emitting of the signal B a high transmission power with low local resolution can be envisaged. Accordingly signal sections of the radio signal can be envisaged, which can be specifically adapted for the respective used data formats.

Preferably it is suggested that the radio signal temporally is divided into a number of subsequent signal sections, wherein the number of the signal sections corresponds at least to a number of data formats that are different from each other, wherein each of the data formats is assigned at least one of the signal sections. This allows for adapting the radio signal, which merely needs to be a single radio signal for the emitting of the different data formats. Therein, of course, it may be envisaged that each data format is assigned at least one of the signal sections. However, also one data format can be assigned more than merely one single signal section. Moreover, also the possibility of assigning individual signal sections to none of the data formats, whereby then for instance the radio signal can contain a non-transmission period.

Depending on the requirements of the respective data format thus also frequencies of the emission of the specific identification data can be influenced for instance by assigning a data format that is frequently to be emitted to several transmission sections, wherein a data format to be less frequently emitted is assigned to fewer transmission sections. Basically, of course, there exists the possibility of dividing the radio signal into a nearly endless sequence of subsequent signal sections, wherein the data formats are correspondingly assigned and thus can form an assignment pattern. However, it may also be envisaged that the radio signal itself on the whole occupies a predetermined radio signal period, which is subdivided into the temporally subsequent signal sections.

Preferably a period of time for a respective one of the signal sections depends on the respective assigned data format. This takes into consideration that the specific identification data in the respective data formats may require periods of different length. Thereby the use of the radio signal can be further improved. Thus, it may be envisaged that the periods of time of the signal sections are measured such that the radio signal preferably emits data essentially without interruption. However, it may also be envisaged that individual or all periods of time for the respective signal section comprise a pause period so that the respective signal sections can be recognized in a simple way as separate signal sections. The pause periods can also be occupied by a suitable synchronization signal.

Preferably the data format assigned to each signal section is provided by a respective formatting unit of the transmission device which is adjusted to the respective data format. This allows for a simple generation or provision of the specific identification data in the respective data format. The formatting unit, however, can also be configured to be able to provide at least two or possibly more data formats. In this embodiment the formatting unit can be configured to be correspondingly switchable so that it provides the specific identification data according to a predetermined switching state in the data format corresponding to the respective switching state. The formatting unit in this respect, however, can possibly also be part of the afore-mentioned control unit, but possibly also part of the single radio unit, in particular if only one single radio unit is envisaged.

According to a further development it is suggested that upon reaching a temporal end of the period of time of a first one of the signal sections automatically a provision of the specific identification data according to a data format that is assigned to a second signal section is triggered which second signal section immediately follows the first signal section. In this connection it is envisaged that the specific identification data are immediately generated in the corresponding data format for the respective assigned transmission section. This is in particular suitable for manufacturing transmission devices or beacons and only thereafter to equip them with individual specific identification data, which then are stored in the transmission device or the beacon. Thereby the hardware devices of the transmission device or the beacon can be standardized so that a cost-effective manufacture is facilitated.

Preferably it is envisaged that each signal section is emitted by its own radio unit of the transmission device, which is assigned to the respective signal section. The radio units thus jointly emit the radio signal, and this preferably in the time multiplex so that each radio unit emits the signal section assigned to it. Thereby the radio signal can be emitted by the radio units specifically adjusted to the respective assigned data format. Preferably, the radio signal is provided by joining the respective transmission sections of the radio units.

Moreover it is suggested that at least between the radio units of the transmission device a communication link exists. Preferably the communication link also exists between radio units of transmission devices of different lighting devices so that a communication network of the kind of a mesh network can be formed. Thereby it is possible to suitably synchronize the different transmission directions in particular their radio units so that a preferably unimpaired emission of respective radio signals can be facilitated. For instance it may be envisaged that radio signals of transmission devices of adjacent lighting devices are synchronized in such a way that they temporally overlap as little as possible so that an as unimpaired as possible receipt of the transmission signals of the lighting devices by the respective communication terminal can be achieved. In this connection with regard to the synchronization also a communication range between the communication devices and the respective transmission device or beacon can be taken into account. Thus, for instance in the case of transmission devices or beacons that are at a great distance from each other by any means an overlapping may be admissible if namely the communication range is exceeded clearly enough by the respective distance of the transmission devices for the respective communication terminal to receive the radio signals of the transmission devices undisturbed.

It turns out to be particularly advantageous if in each case only the one of the radio units assigned to a respective active signal section is supplied with electrical energy. Thereby a particularly energy-efficient operation of the transmission devices or beacons can be achieved. The supply of the radio units with electrical energy can for instance be controlled by means of the control unit.

Further it is suggested that at least two of the signal sections are emitted by a single radio unit, which signal sections contain the specific identification data in two data formats that are different from each other. In this connection it is envisaged that the radio unit is configured to be able to emit the specific identification data in at least two data formats that are different from each other. It may moreover be envisaged that further radio units are envisaged that emit the specific identification data according to a further data format, which for instance could not be realized by means of the first radio unit. On the whole, hereby it can be achieved that the number of required radio units can be kept to a minimum. Preferably, merely a single radio unit needs to be provided, which then is configured to be able to use all data formats that are different from each other.

In particular it turns out to be advantageous if the radio unit is adjusted with regard to a number of the signal sections to be provided and/or the data formats assigned to the respective signal sections. Thereby standardized radio units for the transmission device can be provided, which can be accordingly adjusted as required possibly still after an installation of the lighting device in order to allow for an as broad as possible use of the beacon technology. For this purpose it may be envisaged that the transmission device or the beacon comprises the receiving unit, via which the radio unit can be adjusted accordingly. The adjusting can for instance be effected by programming a computing unit of the transmission device or the radio unit accordingly. This may for instance be effected as part of a firmware update or the like.

Further it is suggested that the radio signal is emitted at least into an area that is lit by means of the lighting device comprising the transmission device in the intended lighting operation mode. Thereby it can be achieved that at least in the area of the lighting device that can be lit also the radio signal corresponding to the assigned transmission device or beacon can be received. However, it may also be envisaged that the radio signal can be received beyond the area that can be lit.

Preferably, the emitting of the radio signal is repeated in a predetermined time interval. This relates in particular to radio signals the temporal extension of which is limited, for instance to a corresponding radio signal period or the like. Thus, no continuous emitting of the radio signal needs to be given, whereby on the one hand energy can be saved and on the other hand a period of time can be created, in which other transmission devices or beacons can emit their radio signals as undisturbed as possible. On the whole, hereby the functionality of a lighting system with several lighting devices comprising the transmission devices or beacons can be improved.

Further it turns out to be advantageous if the transmission device by means of a receiving unit receives a terminal signal of a communication terminal, determines its data format, and emits the radio signal with the specific identification data according to the determined data format. Thereby the transmission device in a highly flexible way responds to specific communication terminals and here in particular to the data format used by the respective communication terminal. For instance it may be envisaged that the transmission device or the beacon switches the emitting of the specific identification data according to the received data format. This has the advantage that the transmission device or the beacon need not emit every one of the data formats regularly. In this way a simple specific adaptation in the intended operation of the transmission device or beacon can be achieved.

It further turns out to be advantageous if in particular the determined data format is compared with the data formats and is assigned to the determined data format of one of the signal sections. The assignment of the signal section can be effected in that a free signal section is assigned to the determined data format. It may, however, also be the case that a signal section already assigned to a data format is now assigned to the determined data format. Thereby the flexibility with regard to the use of the beacon technology can be further improved.

The embodiment variants indicated with regard to the inventive method as well as advantages and effects in the same way also apply in analogy to the inventive lighting device and vice versa. In this connection respective method features can be regarded as functional features for means that are suited herefor.

BRIEF DESCRIPTION OF THE DRAWINGS

Further advantages and features are rendered by the embodiments shown in the following with reference to the enclosed figures. In the figures the same references designate the same features and functions.

DESCRIPTION OF THE PREFERRED EMBODIMENTS

Figure 1:
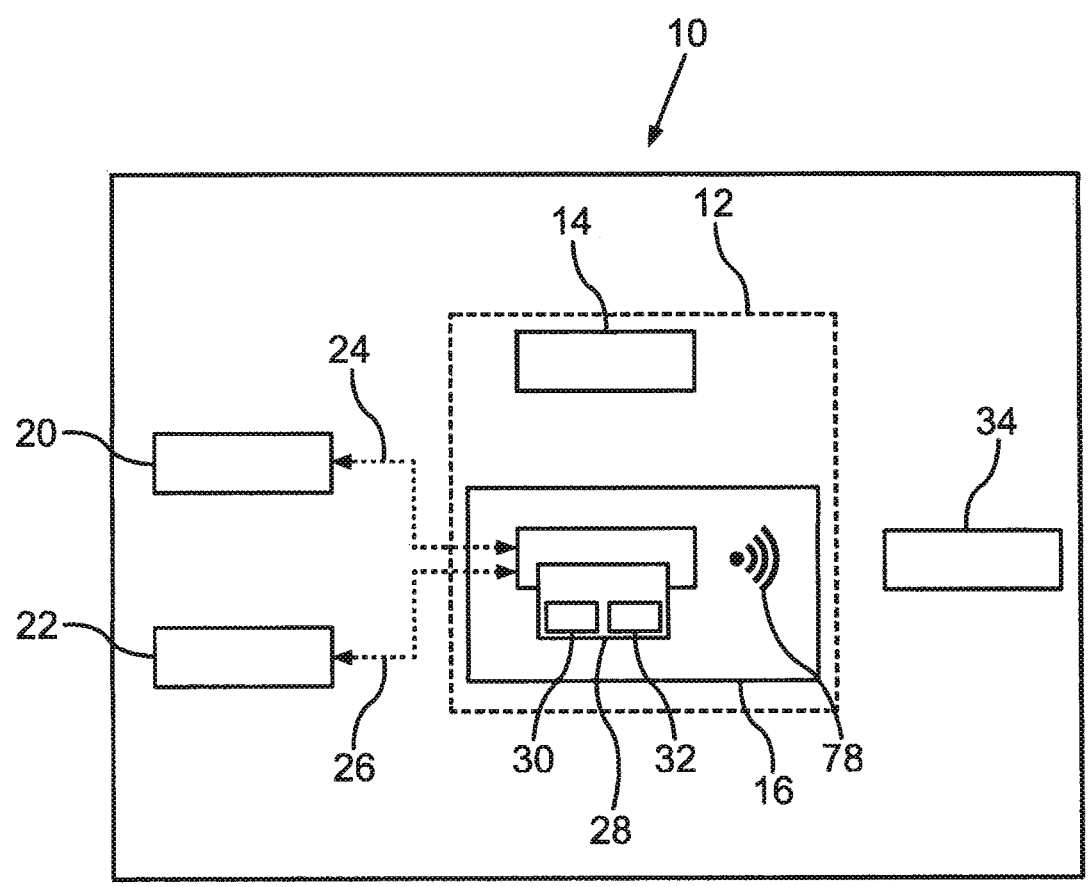
FIG. 1 is a schematic block diagram showing an integration of a beacon as a transmission device into a lighting device of a lighting system comprising several lighting devices.

FIG. 1 shows in a schematic block diagram a lighting system 10, which comprises a lighting device 12 as well as a plurality of further lighting devices 20. Each of the lighting devices 12, 20 comprises a lighting device with one or even several illumination means for emitting light that are not shown as well as a beacon 16 as transmission device. The beacon 16 in the present case is arranged in the illumination device 14. The beacon 16 in the manner of radio broadcasting unidirectionally wirelessly emits a radio signal 78 with identification data that are specific to the beacon 16 in the manner of radio broadcasting. The emitting in the present case is effected whilst using near field radio communication based on a Bluetooth Low Energy Protocol (BLE).

The beacon 16 comprises a control unit 28 including a computing unit 30 as well as a storage unit 32 that is coupled with the computing unit 30 for communication purposes. In the storage unit 32 an executable computing program for the computing unit 30 is stored so that with the computing unit 30 a predetermined functionality can be provided. In the present case the functionality serves for operating the beacon 16 in a predeterminable way. The further lighting devices 20 basically are of a set-up similar to that of the lighting device 12.

In the present case the beacon 16 is configured as a transmitter-receiver device, which besides the emitting of the radio signal 78 can also provide a bidirectional communication link 24. Via the communication link 24 the lighting device 12, and here in particular the beacon 16, is in communication with the further lighting devices 20, which are correspondingly configured.

The communication link 24 in the present case is a bidirectional communication link, which equally is based on near field communication and uses the afore-mentioned BLE standard.

Moreover, the lighting device 12, and here the equally again in particular the beacon 16, via a further communication link 26 are in communication with an infrastructure device 22, thus being able to exchange the data concerning an intended operation of the lighting device 12 as well as also data with regard to the further lighting devices 20. The lighting device 12, and here in particular their beacon 16, thus serve at the same time also as device for forwarding corresponding data from the infrastructure device 22 to the lighting devices 20 and vice versa, for instance in the manner of a network node.

The radio signal 78 emitted by the beacon 16 or the beacons of the lighting devices 20 can be received and evaluated by one or also several communication terminals 34. The communication terminal 34 in the present case is a mobile radio device of the kind of a smart phone. In the present embodiment it is merely envisaged that the communication terminals 34 receive and evaluate the radio signal 78. A communication, however, therefore is merely effected unidirectionally. Beacons of the further lighting devices 20 can equally be received by means of the communication terminal 34. Thereby by means of the communication terminal 34 a number of services can be made available or facilitated, which allow the user of the communication terminal 34 to use most varied additional services.

Within a predetermined area, in which the lighting devices 12, 20 are arranged and in which the radio signal 78 can be received by the communication terminal 34, the user of the communication terminal 34 thus can better orientate himself or navigate as well as find and use other local, in particular digital services, such as for instance apps, app functions, Google maps, Lightify, light control and/or the like. The lighting system 10 with the beacons 16 arranged in the respective lighting devices 12, 20 allows for the aforementioned user potentials a localization or orientation system. In particular it is possible to provide a precise self-localization of the communication terminal 34, whereby services become usable, such as for instance the navigation or the provision of site-specific information.

One aspect of the beacon technology is the possibility of configuration of typical parameters, such as for example a signal strength and/or a transmission interval of the radio signal 78 of the beacon 16. By different configurations various application scenarios can be supported individually. If for instance a high service quality, for instance a precise localization in short intervals, is desired, as it is in particular required in the case of an indoor navigation, preferably very short transmission intervals can be configured.

Figure 2:
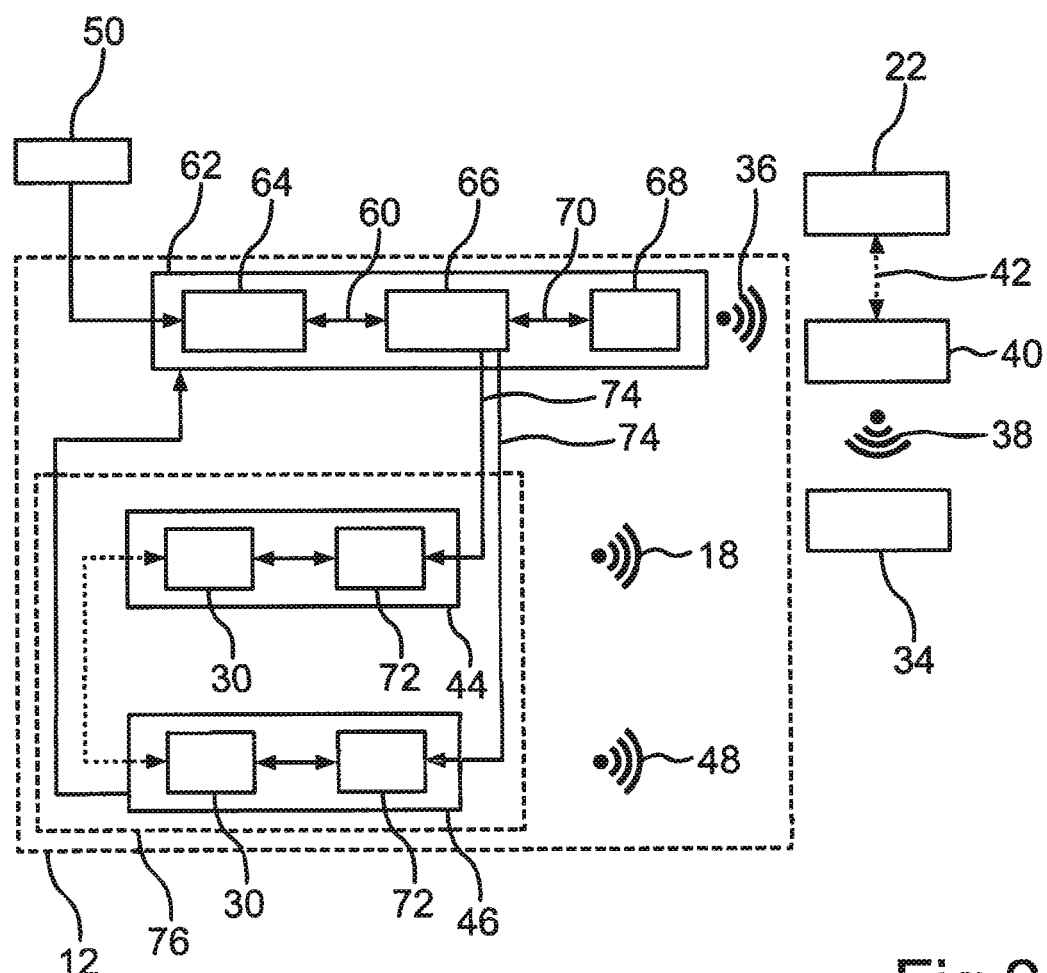
FIG. 2 is a schematic block diagram of a first design for a lighting device according to the invention.

FIG. 2 in a schematic block diagram shows a first embodiment for a lighting device 12, which basically corresponds to the lighting device 12, as it has already been described with regard to FIG. 1. The lighting device 12 according to FIG. 2 has a beacon 76 with two radio units 44, 46 as transmission device as well as an illumination device 62. The beacon 76 with its radio units 44, 46 presently is arranged within the illumination device 62 and is configured to wirelessly emit by near-field radio communication a respective radio-unit-specific radio signal with signal sections 18, 48 with identification data that are specific to the beacon 76 according to the BLE standard as radio standard. Both radio units 44, 46 are configured to emit the radio signal according to exactly this one radio standard. The radio signal in the present case consists of two transmission sections, namely a first transmission section 18, which is provided by the radio unit 44, and a second transmission section 48, which is provided by the radio unit 46.

The radio signal in the signal sections 18, 48 contains the specific identification data of beacon 76 in presently two data formats that are different from each other. The various radio units 44, 46 in this connection are configured according to the respective data formats. For this purpose initially transmission parameters such as for instance a transmission interval, a signal intensity, and/or the like, can be fixed, for instance in the course of a manufacture of the overall system.

In the present case it is further envisaged that the radio unit 44 upon being switched on immediately uses a data format according to protocol F every 50 ms for emitting the specific identification data of the beacon 76. By contrast the radio unit 46 equally emits with an initial delay of 25 ms the specific identification data of the beacon 76 according to the data format based on a protocol G equally every 50 ms. Alternatively or additionally a direct bidirectional communication between the radio unit 44, 46 or also a central information processing for instance of an electronical ballast 66 can be realized. In the case mentioned first preferably a communication link between the radio units 44, 46 is envisaged. In the second case, by contrast, a communication link of the respective one of the radio units 44, 46, each, is provided in addition to the central information processing. In this connection it may be envisaged that the radio units 44,46 emit the signal sections 18, 48 of the radio signal in a respectively defined rhythm, for instance alternately, in order to preferably guarantee that the emitted signal sections 18, 48 at best do not mutually influence each other. For instance it may be envisaged that the radio unit 44 in the rhythm of 100 ms emits its signal and the radio unit 46 emits its signal equally in the rhythm of 100 ms, wherein however the emitting of the signals in each case is temporally offset by 50 MS.

This can render various constructive levers or requirements for the arrangement of the beacon 76 within the lighting device 12, for instance with regard to an arrangement of system elements within the overall system or the like. Further it is presently envisaged that the emitting of the radio signal with the signal sections 18, 48 is effected in the direction of the light 36 emitted by the illumination device 62. Thereby for the user at the same time also an optically perceivable limitation of the communication range to the beacon 76 exists.

The beacon 76 is preferably arranged in the illumination device 62 and here in particular in a housing of the illumination device 62 that is not shown. The arrangement is envisaged in such a way that negative influences due to an electromagnetic compatibility, in particular with regard to the energy supply of the illumination device 62 are as low as possible.

Electronic assemblies of the beacon 76, for instance the radio units 44, 46, are arranged within the illumination device 62, for instance in pedestal areas, also end caps are arranged. Thereby an optical shading of illumination means of the illumination device 62, which in the present case are preferably configured by illumination diode modules, can be avoided. At the same time by a symmetrical arrangement of a symmetrical radiation characteristic can be achieved.

In the present embodiment it is envisaged that the radio signal has two signal sections, namely a first signal section, which is provided by the radio unit 44, and a second signal section, which is provided by the radio unit 46. The radio units 44, 46 are coordinated in such a way that they presently alternately emit the specific identification data according to the data format assigned to them. Thereby it can be achieved that on the one hand services for different communication terminals such as the communication terminal 34 can be provided, and on the other hand it can be made sure that the signal sectors 18, 48 do not mutually influence each other.

The lighting device 12 according to FIG. 2 can be integral part of the lighting system 10, as it has been set out with reference to FIG. 1. The illumination device 62 of the lighting device 12 is shown in detail in a top portion of FIG. 2. The illumination device 62 in the present case comprises an electronic ballast 66, an energy interface 64, which is connected via an energy transmission channel 60 to the electronic ballast 66, as well as a light-emitting diode arrangement 68, which is connected via a further energy transmission channel 70 to the electronic ballast 66. Via the energy transmission channels 60, 70 the light-emitting diode arrangement 68 is supplied in a predeterminable way with electrical energy by the electronical ballast 66 so that the illumination device 62 emits the light 36 in a predeterminable way. For this purpose the energy interface 64 receives electrical energy from a mains supply.

The electronic ballast 66 in the present case further via an energy transmission supplies the radio units 44, 46 of the beacon 76, namely respective energy interfaces 72 which are assigned to the radio units 44, 46. Thereby the beacon 76 can be operated in a predeterminable way, in particular its radio units 44, 46 for emitting the radio signal with the signal sections 18, 48. The lighting device 12 further is connected to the mains supply 50, which receives electrical energy from a public energy supply mains and provides it to the lighting device 12.

The radio signal with its transmission sections 18, 48, which is emitted by the beacon 76, can—as has already been set out as to FIG. 1—be received by means of the communication terminal 34 and can serve for providing further uses or services. Moreover, the communication terminal 34 can be in communication with a router 40 via a communication link 38, which is equally configured as near field radio communication. The router 40 is connected via a wired communication link 42 to an infrastructure device 22, which in the present case as the infrastructure device 22 according to FIG. 1 provides an access to the internet or to a central services server.

Each of the radio units 44, 46 uses the same unambiguous specific identification data assigned to the beacon 76. The radio units 44, 46 format these specific information data, which are present in the respective one of the radio units 44, 46, according to the data format assigned to the radio units 44, 46, and emit the corresponding signal sections 18 or 48 as radio signal.

Figure 3:
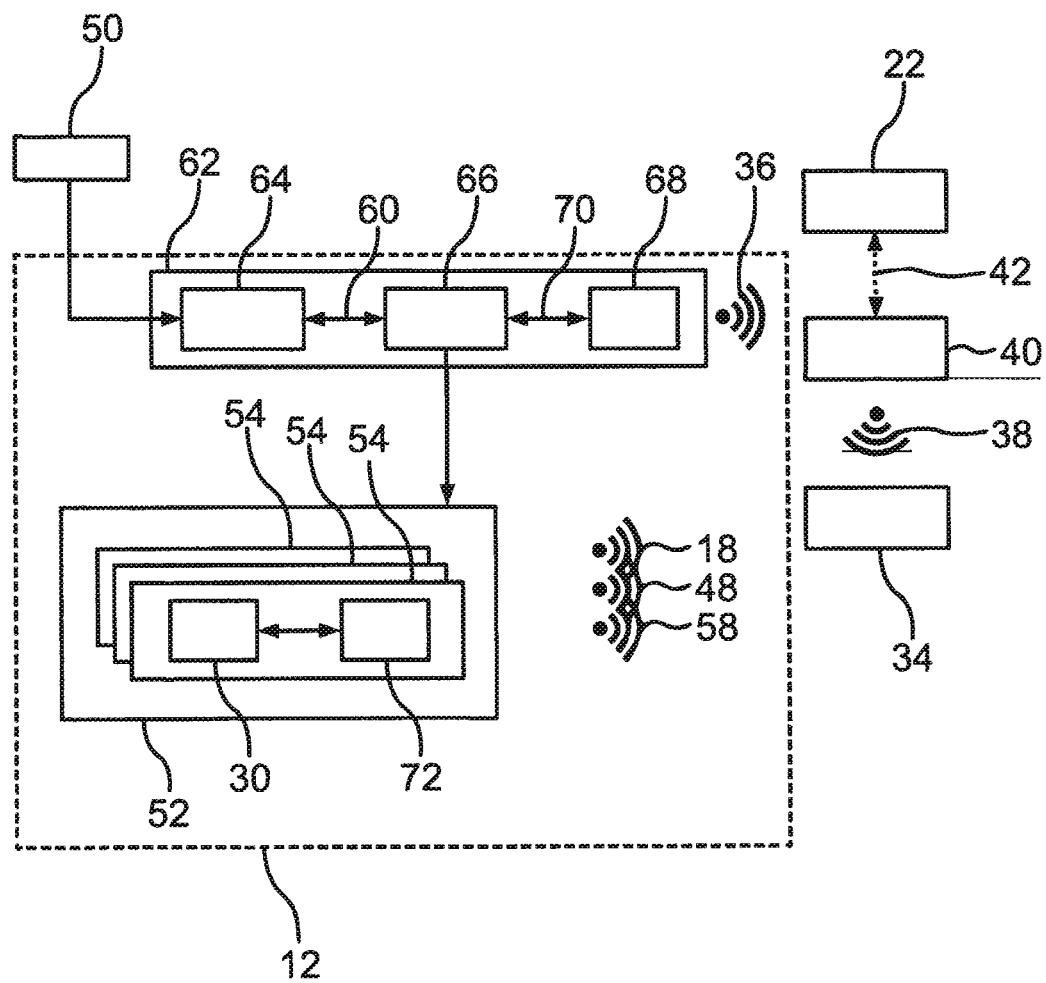
FIG. 3 is a schematic block diagram of a second design for a lighting device according to the invention.

FIG. 3 shows a further embodiment according to the invention in a schematic block diagram as FIG. 2. The embodiment according to FIG. 3 differs from the embodiment according to FIG. 2 by a beacon 52 as transmission device, which is provided instead of the beacon 76 of the FIG. 2 in the lighting device 12. The further features correspond to those already explained as to the FIGS. 1 and 2, for which reason additionally reference is made to the corresponding explanations.

In this variant the emitting of a radio signal, which consists in three signal sections 18, 48, 58, is effected with the aid of radio units 54 that are assigned to a corresponding one of the signal sections 18, 48, 58. The radio units 54 in the present case are arranged to be integrated within the beacon 52, preferably on a common printed circuit board with a common antenna. With regard to the arrangement reference is made to the explanations given as to the preceding embodiments.

Thereby exists the possibility of a use of a common energy interface 72 for energy supply of the different radio units 54 by the illumination device 62. The radio units 54 in the present case in a defined rhythm emit, preferably alternately their corresponding signal sections 18, 48, 58 so that the signal sections 18, 48, 58 preferably do not influence each other. The control or adjusting of the emission of the radio units 54 in this connection is effected by an information processing that is presently configured by a computing unit 30. In FIG. 3 it is shown that each of the radio units 54 comprises a computing unit 30. In an alternative embodiment, however, it may also be envisaged that merely a single computing unit 30 is provided, which is an integral part of the beacon 52 and which correspondingly controls the radio units 54.

The embodiment according to FIG. 3 not only allows for the use of a common energy interface for the purpose of the energy supply by the illumination device 62, but at the same time allow for optimally using the construction space within the lighting device 12, which as a rule is very limited. The radio units 54 are preferably adjusted to each other. The emitting of the corresponding signal sections 18, 48, 58 as radio signal can equally be provided temporally offset.

In this way different transmission protocols such as for instance beacon protocols for different communication terminals 34 can be provided by the beacon 52. This embodiment allows for a flexible configuration of the beacon 52 or a definition of transmission intervals or transmission sections and/or transmission protocols or data formats. The configuration can for instance be effected wirelessly by means of BLE via a communication terminal, such as the communication terminal 34, for which purpose the beacon 52 preferably exhibits a receiving unit. Thereby, the beacon 52 can receive corresponding data for adjusting its parameters.

Here, too, the beacon 52—equally as well as in the preceding embodiment—can be arranged in one or two pedestal areas. Also hereby an optical shading of the light 36 generated by the light-emitting diode arrangement 68 can be avoided.

Preferably the beacon 52 further is arranged on a side or in an end region of the lighting device 12, which is not applied with a high voltage of an energy supply. Thereby interferences of the beacon 52, for instance due to electromagnetic interferences, can largely be avoided.

Figure 4:
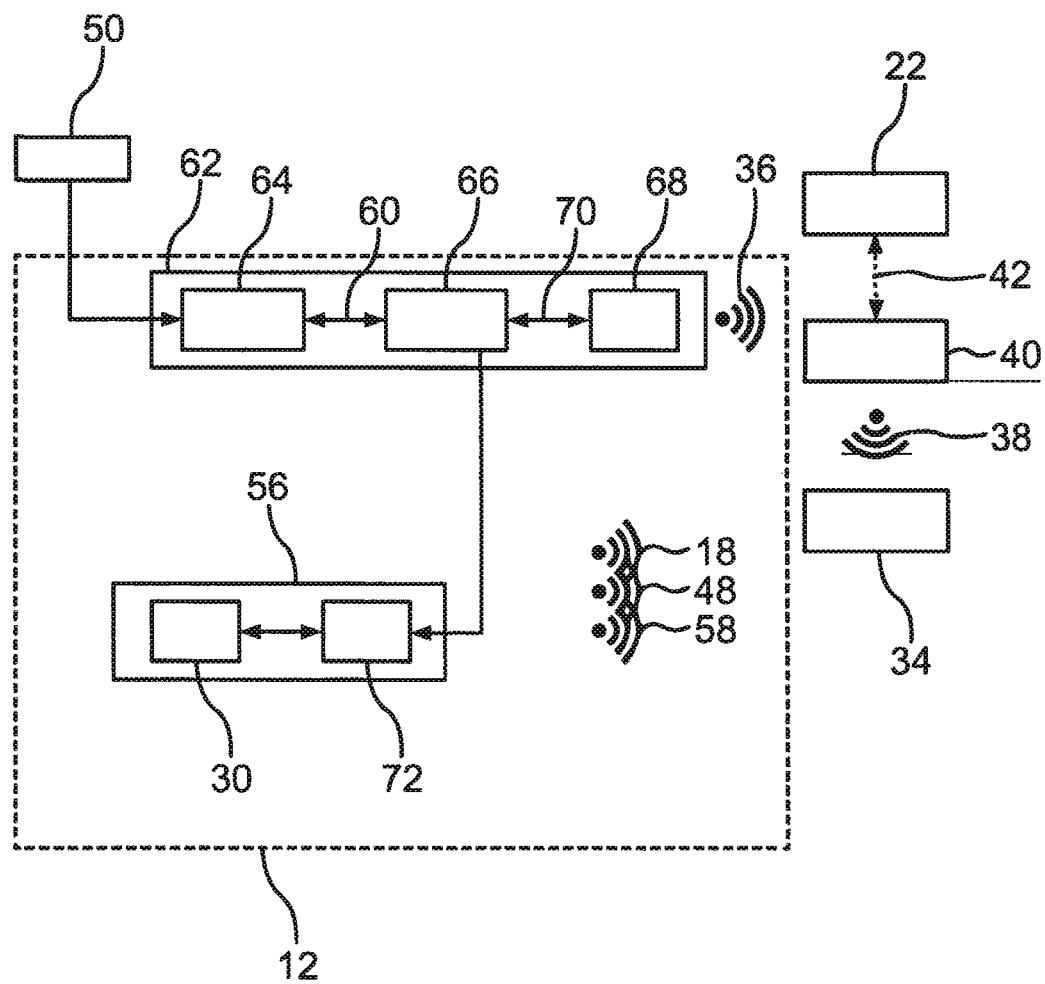
FIG. 4 is a schematic block diagram of a third design for a lighting device according to the invention.

FIG. 4 shows a further schematic block diagram for a further embodiment according to the invention. The embodiment according to FIG. 4 basically is based on the embodiment according to FIG. 3, wherein merely instead of the beacon 52 a beacon 56 is provided. With reference to the further features and functions reference is made to the explanations as to the embodiment according to FIG. 3.

In the embodiment according to FIG. 4 the beacon 56 is envisaged, which merely comprises a single radio unit that is not shown in further detail and is configured to emit the radio signal with the signal sections 18, 48, 58 according to the respective data formats. This means here merely a single radio unit with a single antenna is provided, which can be adjusted nearly freely with regard to the usable data formats in the respective signal sections of the radio signal. Here, too, it is envisaged that the signal sections 18, 48, 58 are emitted in a predetermined defined rhythm, in the present case alternately. The signal sections 18, 48, 58 in this connection are assigned to different beacon protocols. Correspondingly the data formats for these signal sections 18, 48, 58 are selected.

This embodiment allows for the beacon 56 to be adjusted nearly as desired with regard to the data formats and the number of the different data formats to be provided. Thereby a high flexibility can be achieved, because the beacon 56 can, in particular also with hindsight, be adjusted nearly as desired to data formats that are to be newly implemented. For this purpose the beacon 56—equally as the beacon 52—comprises a receiving unit that is not shown in more detail and allows for receiving the data with regard to parameters and data formats to be adjusted. The computing unit 30 is then configured to adjust the beacon 56 accordingly. This embodiment is particularly inexpensive in particular with regard to the required hardware.

The embodiment of FIG. 4, however, can also be used according to a further embodiment. The embodiment of the FIG. 4 namely allows for providing virtual beacons as transmission devices. For this purpose two or more independent radio signals may be envisaged, which accordingly contain several independent radio signals that contain correspondingly own specific identification data. The beacon 56 thus can have two or also several specific identification data, which correspondingly are emitted in radio signals that are independent of each other. Therein the radio signals, of course, can contain the respective specific identification data in data formats that are independent of each other.

This embodiment allows for configuring each individual virtual beacon largely independently, in particular fully independently of each other, for instance whilst using a respective specific application or app. In this connection preferably every one of the virtual beacons is essentially freely configurable. For instance a radio signal content, such as for instance the UUID or the like, a transmission power, a transmission interval, an encoding and/or the like, can be freely chosen. Moreover, this embodiment also allows for using additionally different radio protocols or radio standards, which can be assigned to the respective radio signals of the virtual beacons. Also combinations hereof can be envisaged so that for instance combinations of known beacon protocols with each other can be formed, for instance a combination of iBeacon, Eddiestone, AltBeacon and/or further protocols.

Particularly advantageous it may be envisaged that a computing program, for instance software or firmware or the like, is specifically envisaged for respective individual virtual beacons. The computing unit can update the respective software program, which is assigned to the respective virtual beacon, in this connection preferably independently of the remaining virtual beacons.

According to a further development it may be envisaged that different cryptography methods can be used for the individual virtual beacons in order to for instance restrict an access for certain communication terminals or applications or apps to certain signals. In this way for instance also access authorizations for updating computing programs or parts hereof can be regulated.

In further developments of the afore-mentioned embodiments it may be envisaged that the transmission devices or beacons comprise an optional communication interface. The communication interface can serve for instance for configuring the transmission device or the beacon, for instance by way of selecting a protocol, and/or for adjusting the transmission devices or beacons amongst each other, for instance with regard to transmission intervals and/or the like, and/or with other transmission devices or beacons in adjacently arranged lighting devices. Therein it can be envisaged that a communication is effected via a wireless data network, for instance in the manner of a mesh network or the like. Further it can be envisaged that a communication is effected via an existing communication interface of the lighting device 12, for instance via a light management system, a DALI (digital addressable lighting interface) bus and/or the like. Further, a communication can be effected also via a separate radio channel or a radio technology, such as for instance BLE, ZigBee, WLAN and/or the like. Finally, also the possibility exists to envisage a communication via a combined energy and communication interface, such as for instance Power over Ethernet or the like.

The embodiments merely serve for an explanation of the invention and are not meant to limit it.

The invention claimed is:

1. A method for operation of a transmission device of a lighting device comprising an illumination device, the transmission device being arranged in or immediately on the illumination device, the method comprising:
   wirelessly emitting a radio signal with identification data by the transmission device that are specific to the transmission device, and
   emitting the radio signal according to exactly one predetermined radio standard,
   wherein the radio signal contains the specific identification data in at least two data formats that are different from each other.

2. The method according to claim 1, wherein a period of time for a respective one of the signal sections depends on the respective assigned data format.

3. The method according to claim 1, wherein the data format assigned to every signal section is provided by a respective formatting unit of the transmission device that is adjusted to the respective data format.

4. The method according to claim 1, further comprising:
   upon reaching a temporal end of the period of time of the first one of the signal sections, automatically triggering a provision of the specific identification data according to a data format assigned to a second signal section, which second signal section immediately follows the first signal section.

5. The method according to claim 1, wherein each signal section is emitted by a respective radio unit of the transmission device that is assigned to the respective signal section.

6. The method according to claim 5, wherein at least between the radio units of the transmission device there exists a communication link.

7. The method according to claim 5, further comprising:
   providing only the one of the radio units assigned to a respective active signal section in each case with electrical energy.

8. The method according to claim 5, further comprising: emitting at least two of the signal sections by a single radio unit, which signal sections contain the specific identification data in two data formats that are different from each other.

9. The method according to claim 8, further comprising: adjusting the radio unit with regard to a number of signal sections to be provided and/or the data formats assigned to the respective signal sections.

10. The method according to claim 1, wherein the radio signal is emitted at least into a region, which is illuminated by the lighting device comprising the transmission device in an intended operating lighting mode.

11. The method according to claim 1, further comprising:
    repeating the emitting of the radio signal at a predetermined time interval.

12. The method according to claim 1, further comprising:
    by a receiving unit of the transmission device;
    receiving a terminal signal of a communication terminal, determining its data format, and
    emitting the radio signal with the specific identification data according to the determined data format.

13. The method according to claim 12, further comprising:
    comparing the determined data format with the data formats and
    assigning the determined data format one of the signal sections.

14. A lighting device comprising:
    a transmission device and an illumination device, the transmission device being arranged in or immediately on the illumination device and being configured to wirelessly emit a radio signal with identification data that are specific to the transmission device,
    wherein the transmission device further is configured to emit the radio signal according to precisely one predetermined radio standard,
    wherein the radio signal contains the specific identification data in at least two data formats which are different from each other.

15. The lighting device of claim 14, wherein the radio signal is temporally subdivided into a number of subsequent signal sections, wherein the number of signal sections corresponds at least to a number of the data formats that are different from each other, and wherein each data format is assigned to at least one of the signal sections.

16. A method for operation of a transmission device of a lighting device comprising an illumination device, the transmission device being arranged in or immediately on the illumination device, the method comprising:
    wirelessly emitting a radio signal with identification data by the transmission device that are specific to the transmission device, wherein the radio signal is emitted according to exactly one predetermined radio standard, and wherein the radio signal contains the specific identification data in at least two data formats that are different from each other; and
    temporally subdividing the radio signal into a number of subsequent signal sections, wherein the number of signal sections corresponds at least to a number of the data formats that are different from each other, and wherein each data format is assigned at least one of the signal sections.

* * * * *